UNITED STATES PATENT OFFICE.

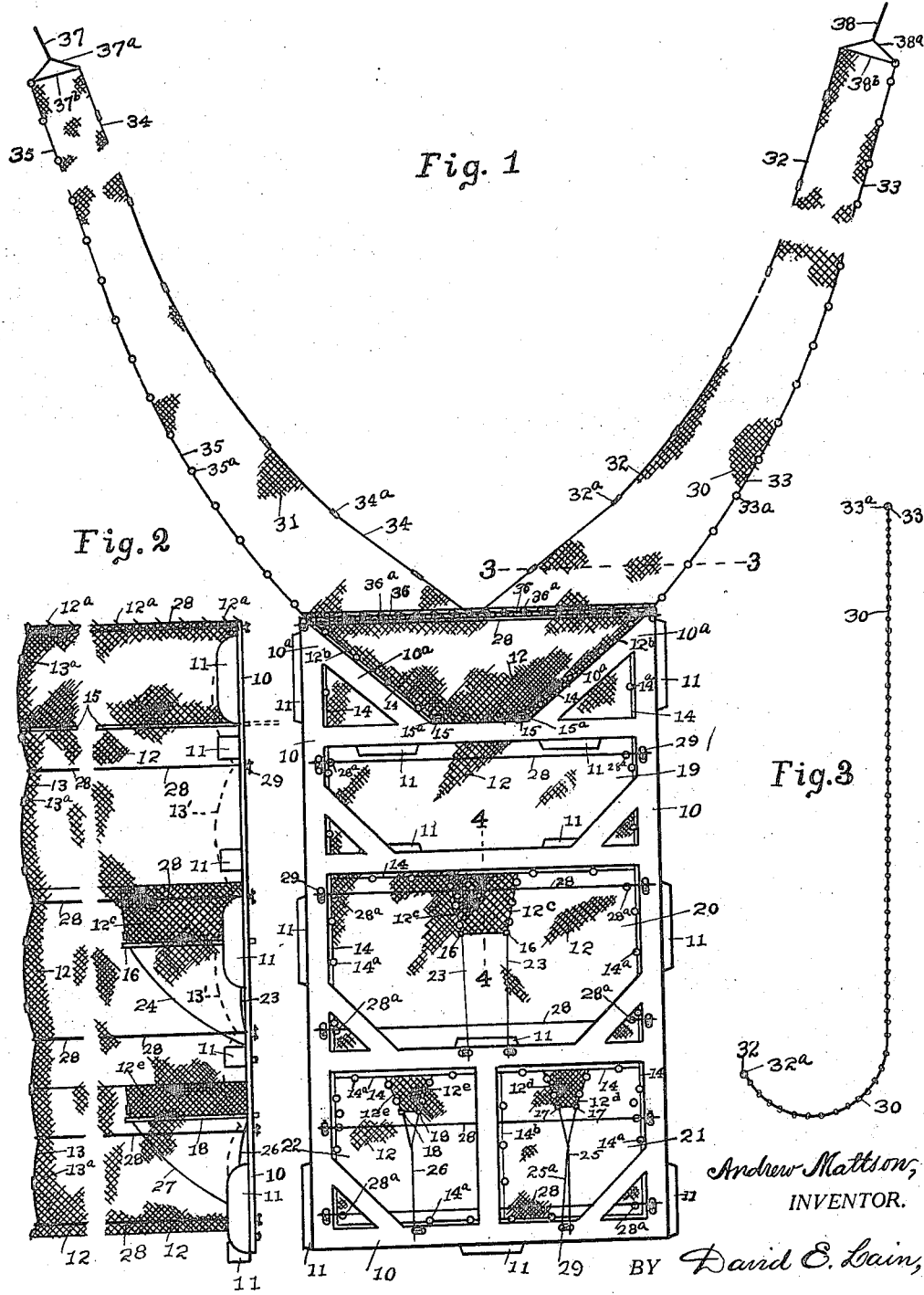

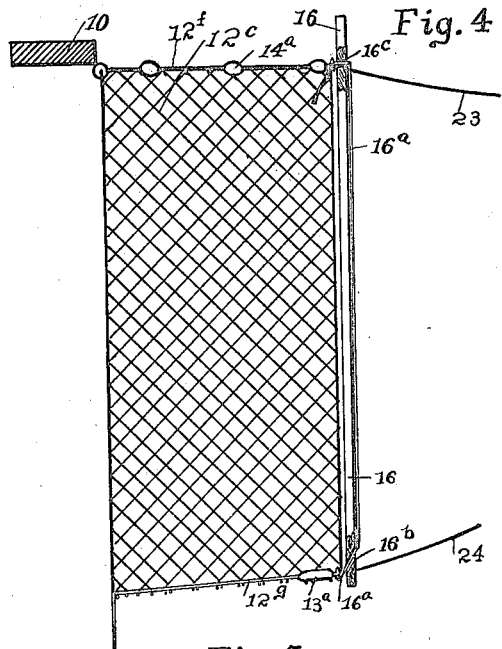
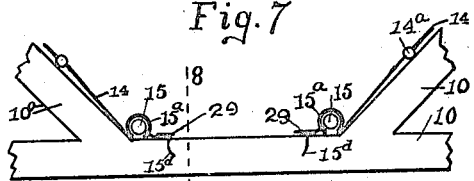
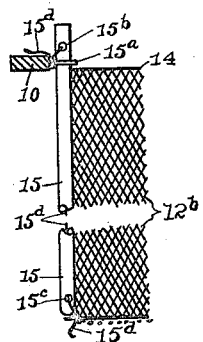
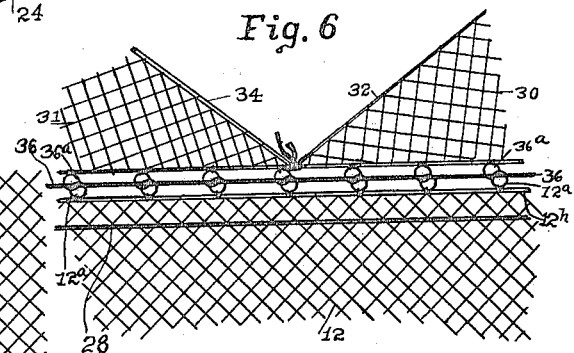
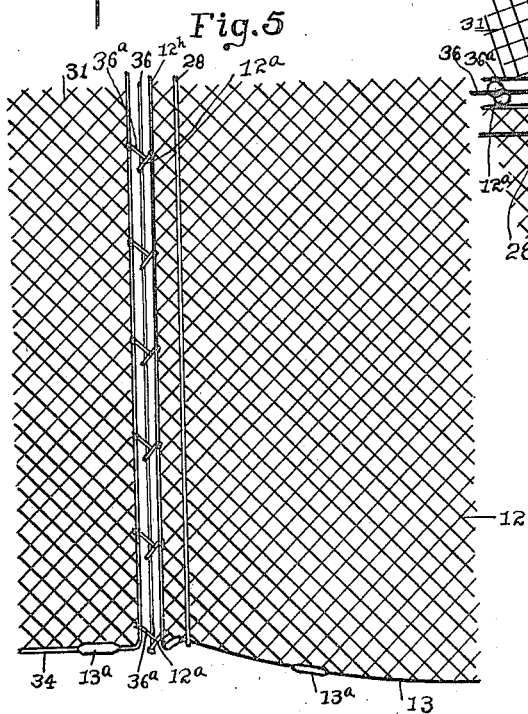

ANDREW MATTSON, OF BELLINGHAM, WASHINGTON.

SEINE.

1,386,889.　　　Specification of Letters Patent.　　Patented Aug. 9, 1921.

Application filed January 15, 1920. Serial No. 351,660.

*To all whom it may concern:*

Be it known that I, ANDREW MATTSON, a citizen of the United States, and a resident of Bellingham, in the county of Whatcom and State of Washington, have invented a new and useful Seine, of which the following is a specification.

My invention relates to improvements in pocket seines, the kind adapted to be towed while fishing to hasten the entry of fish into the pockets where they are securely impounded.

I was granted a patent of the United States for a seine on June 1st, 1915, Number 1,141,128. My present invention, while of the same general character, is radically different in detail. In operating my earlier invention objections were found to the inflexible character of the structure beneath the water. Injury was caused when passing over shallows before protective changes could be made. There were also lacking other structural details which made operation difficult. These objectionable features have been overcome in the present invention and changes introduced which enhance the fishing efficiency and convenience of my seine.

The objects of my invention are to produce a seine into which fish may be readily directed and impounded while it is towed, which may be easily and quickly adjusted for passing over shallows, and which may be quickly changeable to a nonfishing form for towing to distant points and as quickly returned to its operative form and condition.

I accomplish these objects with the mechanism illustrated in two sheets of accompanying drawings in which Figure 1 is a plan view of my seine with leads or wings in operative position, Fig. 2 is a side elevation of Fig. 1 from which the wings have been omitted, Fig. 3 is a cross section of Fig. 1 on the line 3—3, Fig. 4 is a cross section of Fig. 1 on the line 4—4, drawn on a larger scale, Fig. 5 is a side elevation of the bottom portion of the side of the seine where the wings are fastened to the pound, drawn on a larger scale, Fig. 6 is an enlarged view of a portion of the bow end of the pound where the wings meet, Fig. 7 is an enlarged view of a portion of Fig. 1 showing that part of the frame where the main entrance is constructed, and Fig. 8 is a sectional view of Fig. 7 on the line 8—8.

Similar characters refer to similar parts throughout. Certain parts are broken away for lack of space or to show others hidden thereby.

My pocket seine comprises a pontoon supported frame, a box-like net pound hung beneath and wide spreading leads or wings in front, by which the entire structure is towed with power boats hitched thereto.

10 is a firmly braced timber frame of rectangular form except its front end which is V form. 11, 11 are pontoons fastened beneath frame 10 to provide additional buoyancy. 12 is a net structure or pound comprising a rectangular bottom of substantially the exterior dimensions of frame 10, a rear end and two sides and a front end inclined inward at $12^b$, $12^b$, forming an inclosure except for the main entrance between spreaders 15, 15. Fastened to the strengthening line on the front end of the bottom and sides of net 12 are spaced rings $12^a$. Around the entire bottom is fastened lead line 13 to which are attached the leads or sinkers $13^a$ for submerging the net. Around the entire pound on its upper edge is fastened a float line 14 to which are attached spaced corks or floats $14^a$ for retaining the upper part of the web in operative position. Line 14 is fastened to frame 10 at intervals. 15, 15 are two spreaders mounted in staples $15^a$ on the front end of frame 10 at the inner ends of inclined front web leads $12^b$, $12^b$. Each of spreaders 15 has a top and bottom hole, $15^b$ and $15^c$ respectively, through its body through which is reeved one of lines $15^d$. The lower end of line $15^d$ is fastened to the bottom web, said spreader is forced down to the bottom and retained there by fastening said line to cleat 29 after being hauled taut. See Figs. 7 and 8. The main entrance to the pound is thus completed. The opening between spreaders 15 reaches to the bottom of the pound, and enters the forward compartment or pocket 19. Leading from pocket 19 into middle pocket 20 is tunnel $12^c$ having float line $12^f$, sinker line $12^g$, and spreaders 16, 16. Each of said spreaders has a hole $16^b$ near its lower end and a hole $16^c$ through its body near its upper end, see Fig. 4. Through said holes in each of spreaders 16 is reeved one of lines $16^a$ the lower end of which is fastened to sinker line $12^g$ and the upper end is fastened to float line $12^f$, after being hauled taut, thus installing said spreaders. Tunnel $12^c$ is retained in operative position by top guy lines 23 and bottom guy lines 24 fastened to spreaders 16 and frame 10. There are two stern pockets 21 and 22 entered from pocket 20 by tunnels 12$^d$ and 12$^e$ respectively. Tunnel 12$^d$ is constructed like tunnel 12$^c$ but is smaller. It has spreaders 17, 17 installed like spreaders 16, 16 and is further held in operative position by guy ropes 25 and 25$^a$. Tunnel 12$^e$ is of similar construction, has spreaders 18, 18 and guy lines 26, 27. Slings 28, 28 are used to support the bottom of web 12 when in operative position and to draw the entire web close up beneath frame 10 to dotted position 13' for distant towing. Said lines are fastened to cleats 29, 29 on frame 10 and are on the exterior of the web but fastened to the bottom of same at eyelets 28$^a$, 28$^a$. 30 and 31 are the right and left-hand wings. 32 is the sinker line on the lower edge of wing 30 and 32$^a$, 32$^a$ are the sinkers thereon. 33 is the float line on the upper edge of wing 30, and 33$^a$, 33$^a$ are the floats thereon. 34 is the sinker line on wing 31, and 34$^a$, 34$^a$ are the sinkers thereon. 35 is the float line on wing 31 and 35$^a$, 35$^a$ are floats thereon. 36$^a$ are rings fastened at spaced distances on the inner ends of wings 30 and 31 and register with rings 12$^a$. 36 is a line laced through rings 12$^a$ and 36$^a$ to fasten the wings in operative relation with the front end of 12. 37, 37$^a$, and 37$^b$ are the tow line, bridle and spreader fastened to the outer end of wing 31. 38, 38$^a$ and 38$^b$ are respectively the tow line, bridle and spreader fastened to the outer end of wing 30.

A power boat is hitched to each of tow lines 37 and 38 and the seine is drawn slowly through the water in the operative position illustrated. Fish coming against the inside of the wings are led to the entrance of the pound, through the portal between spreaders 15, 15 whence they enter bow pocket 19, thence through tunnel 12$^c$ into middle pocket 20 where they are quite securely held, and thence through tunnels 12$^d$ and 12$^e$ into pockets 21 and 22 where they are securely impounded and must await the convenience of the fishermen to remove them.

While fishing it may happen that the net passes through water too shallow for it to clear the bottom. When this occurs the spreaders, 15 and 15 are quickly released by untying lines 15$^d$, 15$^d$ and permitting them to rise in staples 15$^a$, 15$^a$. If the water becomes so shallow that spreaders 16, 17 and 18 also ground they are released in similar manner and nothing but the net itself remains to drag over the bottom. This also can be quickly raised and stowed snugly beneath frame 10 by taking in lines 28 when it will occupy its dotted position at 13'.

It is thus apparent that all of the operative changes needed to properly fish with this seine and protect it from changing depths of water on the fishing grounds may readily be made while the seine is being towed through the water.

Having thus fully disclosed my invention, what I claim is new and desire to secure by Letters Patent is, 1. In a seine in combination, a floatable frame, a web fish pound fastened beneath said frame having a plurality of pockets with communicating openings, a pair of spreaders removably fastened to the sides of said openings, sinker lines with sinkers fastened to the bottom of said pound, and float lines with floats fastened to the top of said pound.

2. In a seine in combination, a floatable frame, a web fish pound fastened beneath said frame having an opening in its bow end and a plurality of pockets with communicating openings, a pair of web wings removably fastened to the bow end of said pound, a pair of spreaders removably fastened to the sides of each of said openings, sinker lines with sinkers fastened to the bottom of said pound and said wings, and float lines with floats fastened to the top of said pound and said wings.

3. In a seine in combination, a floatable frame, a web fish pound fastened beneath said frame having an opening in its bow end and a plurality of pockets with communicating openings, a pair of web wings removably fastened to the bow end of said pound, a pair of vertical spreaders removably fastened to the sides of each of said openings, sinker lines with sinkers fastened to the bottom of said pound and said wings, float lines with floats fastened to the top of said pound and said wings, and a plurality of rope slings outside of and beneath said pound the ends of which are removably fastened to said frame.

4. In a seine in combination, a floatable frame, a web fish pound fastened beneath said frame having a plurality of pockets with communicating tunnels, a pair of vertical spreaders removably fastened to the outlet of each of said tunnels, each spreader having a hole through its body below and a hole through its body above and a rope reeved through said holes and fastened below to said tunnel bottom and above to said tunnel top.

ANDREW MATTSON.